United States Patent
Hu et al.

(10) Patent No.: US 8,195,386 B2
(45) Date of Patent: Jun. 5, 2012

(54) MOVABLE-BODY NAVIGATION INFORMATION DISPLAY METHOD AND MOVABLE-BODY NAVIGATION INFORMATION DISPLAY UNIT

(75) Inventors: Zhencheng Hu, Kumamoto (JP);
Keiichi Uchimura, Kumamoto (JP)

(73) Assignee: National University Corporation Kumamoto University, Kumamoto-shi (JP)

( * ) Notice: Subject to any disclaimer, the term of this patent is extended or adjusted under 35 U.S.C. 154(b) by 1092 days.

(21) Appl. No.: 11/663,909

(22) PCT Filed: Sep. 27, 2005

(86) PCT No.: PCT/JP2005/017715
§ 371 (c)(1),
(2), (4) Date: Mar. 11, 2008

(87) PCT Pub. No.: WO2006/035755
PCT Pub. Date: Apr. 6, 2006

(65) Prior Publication Data
US 2008/0195315 A1    Aug. 14, 2008

(30) Foreign Application Priority Data
Sep. 28, 2004   (JP) ................................. 2004-282190

(51) Int. Cl.
*G05G 5/00*          (2006.01)
(52) U.S. Cl. ........ 701/212; 701/400; 701/401; 701/418; 701/428; 701/431; 701/436; 701/739; 701/448; 345/7; 345/9; 349/11
(58) Field of Classification Search ......................... None
See application file for complete search history.

(56) References Cited

U.S. PATENT DOCUMENTS

| 6,018,697 | A  | * | 1/2000  | Morimoto et al. | 701/411 |
| 6,181,302 | B1 | * | 1/2001  | Lynde | 345/7 |
| 6,182,010 | B1 | * | 1/2001  | Berstis | 701/441 |
| 6,199,014 | B1 | * | 3/2001  | Walker et al. | 701/428 |
| 6,208,933 | B1 | * | 3/2001  | Lazar | 701/409 |
| 6,285,317 | B1 | * | 9/2001  | Ong | 342/357.57 |
| 6,356,840 | B2 | * | 3/2002  | Kusama | 701/437 |
| 6,360,168 | B1 | * | 3/2002  | Shimabara | 701/436 |
| 6,470,265 | B1 | * | 10/2002 | Tanaka | 701/532 |

(Continued)

FOREIGN PATENT DOCUMENTS

JP        A 10-132598        5/1998

(Continued)

*Primary Examiner* — Jonathan M Dager
(74) *Attorney, Agent, or Firm* — Oliff & Berridge, PLC

(57) ABSTRACT

A movable-body navigation information display unit is provided. In the movable-body navigation information display unit, a driver can intuitively and accurately recognize a relation between navigation information and a real picture or a real landscape. In addition, it is possible to avoid a state that visibility of a caution-needed picture such as a pedestrian in the real picture and a real picture of a road construction site is inhibited by an image of the navigation information. An image data creating section (405) matches road shape data with a road shape model to estimate posture data. In addition, the image data creating section creates picture (image) data for accurately compositing and displaying the image of the navigation information in an appropriate position in a real picture (or in a real landscape) of a road ahead of a movable body, and displays the navigation information as a three-dimensional icon or the like. A picture display section (5) performs display based on the picture data.

6 Claims, 10 Drawing Sheets

U.S. PATENT DOCUMENTS

| | | | |
|---|---|---|---|
| 6,885,939 B2 * | 4/2005 | Schmidt et al. | 701/428 |
| 6,977,630 B1 * | 12/2005 | Donath et al. | 345/7 |
| 7,728,869 B2 * | 6/2010 | Jung | 348/113 |
| 7,737,965 B2 * | 6/2010 | Alter et al. | 345/419 |
| 7,751,970 B2 * | 7/2010 | Hirayama et al. | 701/457 |
| 7,783,422 B2 * | 8/2010 | Tanaka | 701/436 |
| 7,852,355 B2 * | 12/2010 | Friedrich et al. | 345/633 |
| 7,966,128 B2 * | 6/2011 | Widodo et al. | 701/300 |
| 7,990,394 B2 * | 8/2011 | Vincent et al. | 345/629 |
| 2003/0080978 A1 * | 5/2003 | Navab et al. | 345/633 |
| 2003/0160867 A1 * | 8/2003 | Ohto et al. | 348/135 |
| 2003/0210228 A1 * | 11/2003 | Ebersole et al. | 345/157 |
| 2004/0066376 A1 * | 4/2004 | Donath et al. | 345/169 |
| 2004/0179104 A1 * | 9/2004 | Benton | 348/207.99 |
| 2005/0116964 A1 * | 6/2005 | Kotake et al. | 345/629 |
| 2005/0278111 A1 * | 12/2005 | Ujino | 701/200 |
| 2006/0004512 A1 * | 1/2006 | Herbst et al. | 701/208 |
| 2006/0155466 A1 * | 7/2006 | Kanda et al. | 701/209 |
| 2006/0155467 A1 * | 7/2006 | Hortner et al. | 701/211 |
| 2006/0190812 A1 * | 8/2006 | Ellenby et al. | 715/512 |
| 2006/0238383 A1 * | 10/2006 | Kimchi et al. | 340/995.1 |
| 2006/0262140 A1 * | 11/2006 | Kujawa et al. | 345/633 |
| 2008/0147325 A1 * | 6/2008 | Maassel et al. | 702/5 |
| 2009/0005961 A1 * | 1/2009 | Grabowski et al. | 701/200 |
| 2009/0222203 A1 * | 9/2009 | Mueller | 701/211 |
| 2010/0268451 A1 * | 10/2010 | Choi | 701/201 |
| 2011/0153198 A1 * | 6/2011 | Kokkas et al. | 701/201 |
| 2011/0228078 A1 * | 9/2011 | Chen et al. | 348/113 |

FOREIGN PATENT DOCUMENTS

| | | |
|---|---|---|
| JP | A-10-281794 | 10/1998 |
| JP | A-11-281387 | 10/1999 |
| JP | A 11-304499 | 11/1999 |
| JP | A 2001-331787 | 11/2001 |
| JP | A-2002-236027 | 8/2002 |
| JP | A 2003-47050 | 2/2003 |
| JP | A 2003-121167 | 4/2003 |
| JP | A 2003-256997 | 9/2003 |
| JP | A 2004-150918 | 5/2004 |
| WO | WO 2004/048895 A1 | 6/2004 |

* cited by examiner

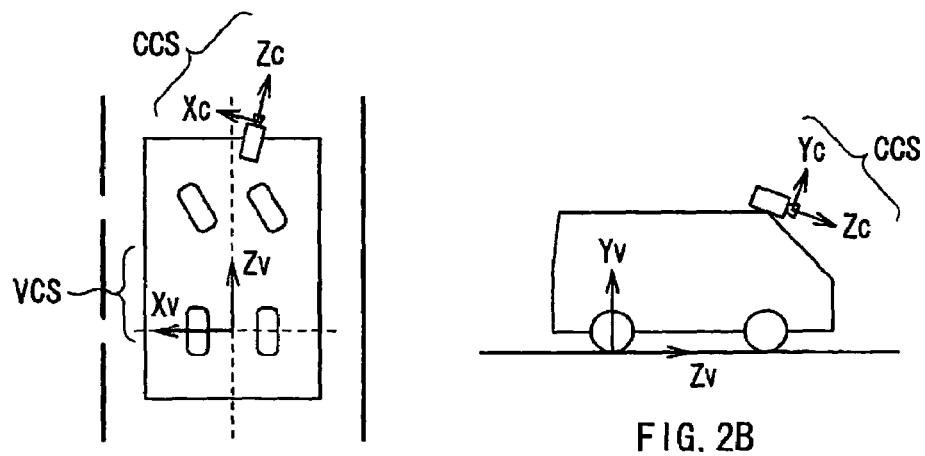
FIG. 2A
FIG. 2B
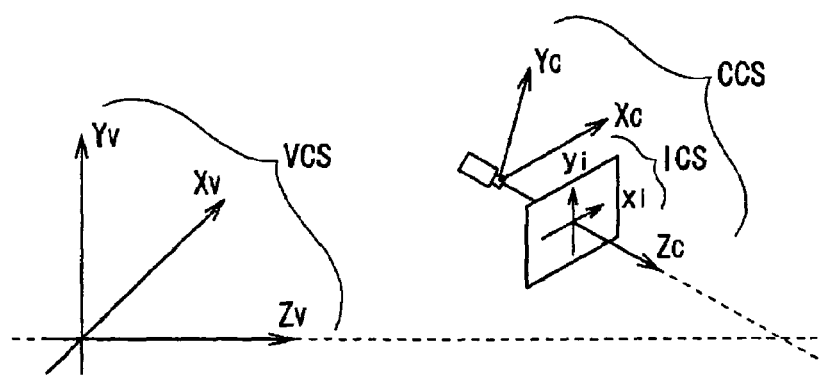
FIG. 2C
FIG. 2D
FIG. 3

FORMULA 1 : $e\vec{p} = \tilde{A}\vec{P}$ ($\vec{P} = [X_c Y_c Z_c 1]^T$, $\vec{p} = [x_i y_i 1]^T$ are respectively coordinates of the CCS coordinate system and the ICS coordinate system.)

FORMULA 2 : $\tilde{A} = K \begin{pmatrix} 1 & 0 & 0 & 0 \\ 0 & 1 & 0 & 0 \\ 0 & 0 & 1 & 0 \end{pmatrix} M = K[E/0]M$ FORMULA 3 : $K = \begin{pmatrix} S_x & S_\theta & u_0 \\ 0 & S_y & v_0 \\ 0 & 0 & 1 \end{pmatrix}$ FORMULA 4 : $M = \begin{pmatrix} R_{11} & R_{12} & R_{12} & T_X \\ R_{21} & R_{22} & R_{23} & T_Y \\ R_{31} & R_{32} & R_{33} & T_Z \\ 0 & 0 & 0 & 1 \end{pmatrix} = \begin{bmatrix} R & T \\ 0 & 1 \end{bmatrix}$ FORMULA 5 : $\vec{p} = \tilde{A}\vec{P} = K[E/0]M\vec{P} = K[E/0] \begin{bmatrix} R & T \\ 0 & 1 \end{bmatrix} \vec{P}$ FORMULA 6 : $\vec{p} = \tilde{A}(\vec{P} ; \sigma)$.

FORMULA 7 : $\Re_i = (c_{0i}, c_{1i}, n_{li}, n_{ri}, w_i, L_i)^T$

FORMULA 8 : $\vec{p}(\Re_i') = \tilde{A}(\Re_i' ; \sigma)$ (The road horizontal shape model of the road centerline $\Re_i$ is converted to the model $\Re_i'$ based on the vehicle coordinate system VCS)

FORMULA 9 : $RSL : \to p(x, y) = \sum_i \sum_j (\lambda_{x-i, y-j} \chi_{i,j})$

FORMULA 10 : $E(\sigma) = \frac{1}{|\eta\sigma|} \sum_{p \in \eta\sigma} \|RSL : \to p(x,y)\| = \frac{1}{|\eta\sigma|} \sum_{p \in \eta\sigma} \|RSL : \to \tilde{A}(\Re' ; \sigma)\|$

FIG. 7

MOVABLE-BODY NAVIGATION INFORMATION DISPLAY METHOD AND MOVABLE-BODY NAVIGATION INFORMATION DISPLAY UNIT

TECHNICAL FIELD

The present invention relates to a movable-body navigation information display method and movable-body navigation information display unit for, for example, collecting, processing, and displaying information on a current position of a movable body and information for navigation related thereto, such as a so-called car navigation system and a display method of car navigation information thereby.

BACKGROUND ART movable-body navigation system such as a so-called car navigation system has been developed. In the movable-body navigation system, a current position of a movable body such as a motor vehicle is detected, the detected current position is displayed on a display screen together with a road map of surroundings, various guide information such as a destination and a route is displayed, and voice output is made.

In such an existing car navigation system, the current position of the movable body is checked as follows. That is, an autonomous-navigation controlling section performs tracing on a map previously stored as data in a storing means such as a CD-ROM (Compact Disc Read Only Memory) based on the speed pulses from a speed sensor and a direction obtained by earth magnetism from a geomagnetic sensor. In addition, a GPS signal transmitted from a GPS satellite is used. In the car navigation system in the early stage of the development in this field, there was an apparent malfunction (detection error) or the like in the past. That is, due to a measurement error or the like, an actual traveling position is significantly deviated from the trace position on the map. For example, when a vehicle is traveling along the coast actually, the traveling position of the vehicle detected by the car navigation system is indicated in the sea. However, for addressing such a significant position deviation, a technique of position correction (map matching) and the like have been developed. Therefore, in these days, the precision of detecting the traveling position of the vehicle is sufficient.

By superimposing information of the current position of the vehicle obtained as above on map information obtained from a large-volume data storing means such as a CD-ROM, an image showing the current position and the road map in a given range in the vicinity thereof can be displayed as a plane map-like two-dimensional image on a screen of an image display unit such as a liquid crystal display unit. In addition, it is possible to display so-called navigation information such as a vehicle position, a traveling direction, speed, map information, a course guide, the shortest route, and road information by being superimposed on the two-dimensional image map, or by being inserted in an appropriate position in the two-dimensional image map.

In some existing navigation display units, an image of information, for example, a traveling position and a traveling direction indicated by an icon of an arrow or the like, a recommended route (optimal route) from the current position to the destination is displayed by being superimposed on a two-dimensional image road planar map or on a road map that shows the surrounding landscape in a state of a three-dimensional CG. Further, in some existing navigation display units, traffic jam information or the like obtained by a VICS sensor or the like is displayed with a text label on the screen.

However, such an existing technique can only provide indirect navigation information using the plane (two dimensional) simplified map and the image expressed three dimensionally but abstractly and simply expressed by CG. Therefore, for a driver in the motor vehicle, there are problems, for example, as follows. That is, it is not possible to intuitively recognize a relation between the information such as the current position and the course guide and the road in the landscape actually seen through the windshield.

To solve the foregoing problems, for example, in Patent document 1, Patent document 2 and the like, a navigation system using a real picture in addition to the map information is proposed.

In the technique disclosed in Patent document 1, a current position and a traveling direction of a movable body are detected, and navigation information to be displayed according to the detected current position and the detected traveling direction is selected. An image of the navigation information read according to the current position of the vehicle is superimposed on a real picture captured by an image pickup device from a camera angle approximately similar to a landscape ahead of the vehicle in the traveling direction seen through the windshield of the vehicle, and the superimposed result is displayed on a screen or the like of a liquid crystal display panel. It is stated in Patent document 1 that a relation between the picture of the real road, the surrounding landscape thereof and the navigation information can be displayed easily recognizable visually. Further, in a general car navigation system, the navigation information is mainly picture information displayed on the picture display section. Therefore, there is a possibility that a driver gets distracted easily while driving.

Therefore, in Patent document 2, the following technique is proposed. That is, an image pickup device such as a CCD camera that captures a landscape ahead of a body for motor vehicle is provided, for example, in a position near the ceiling of the windshield of the vehicle or in the vicinity of the dashboard. A picture (image) of the landscape including a road ahead of the body for motor vehicle captured by the image pickup device is displayed by being inserted in a given position of the screen displaying map information as a sub-screen. According to such a technique, even when the driver of the vehicle views navigation information such as a map displayed on the screen of the image display unit while driving, the driver views the real picture of the landscape ahead of the vehicle displayed as the sub-image in the given position on the screen. It is stated in Patent document 2 that the driver can thereby comprehend a state in front of the vehicle without returning her/his attention to the landscape ahead of the vehicle.

Further, the following technique or the like has been proposed. In such a technique, setting is made so that, for example, when it is determined that an obstruction shown in the real picture of the sub-screen is large or when an object suddenly darts out from the side, the outer dimensions of the sub-screen (screen size) are enlarged. Thereby high-risk state in front of the vehicle is informed to the driver promptly and visually. In addition, such a high-risk state can be shown to the driver with high visibility. Consequently, safer driving can be secured.

Further, to determine the leading vehicle and operate automatic steering, it is necessary to more accurately comprehend the landscape including the road and the like ahead of the movable body as data. Therefore, for example, in Patent document 3, the following technique is proposed. In such a technique, a three-dimensional road shape is estimated by using image road information and map road information. In the technique disclosed in Patent document 3, the image road shape extracted from image data of the landscape ahead of the vehicle and map data around the vehicle are projected in one two-dimensional or three-dimensional logical space. Based on an overlapping state in the logical space of both of the projected road shapes, estimation is made for the road shape, a posture of the vehicle to the road surface, an absolute position of the vehicle and the like. In this technique, based on a picture captured by a monocular CCD camera, a sufficiently accurate road shape is estimated, and accurate determination of the leading vehicle and automatic steering are realized.

Patent document 1: Japanese Unexamined Patent Application Publication No. 10-132598

Patent document 2: Japanese Unexamined Patent Application Publication No. 11-304499

Patent document 3: Japanese Unexamined Patent Application Publication No. 2001-331787

DISCLOSURE OF THE INVENTION

However, in the technique disclosed in the Patent document 1, there are problems as follows. That is, first, the image information is only used as a background picture. For example, regarding an image of an arrow indicating the destination, the image is firstly displayed in the central portion of the screen, and then is displayed to move linearly from the original position to the backward landscape (in general, from the upper side to the lower side of the display screen) in the central section of the screen as the vehicle travels.

Therefore, in the case of displaying the navigation information on a curved road or in the case of a road provided with multi-lanes such as two lanes on each side, there are the problems as follows. That is, it is not possible to determine what position in the landscape the navigation information display accurately indicates. In some cases, the navigation information display indicates a totally deviated position.

Secondly, the posture parameter of the camera is previously fixed as the angle of the camera optical axis to the ground surface (or horizontal direction). Therefore, for example, when the posture of the camera is changed due to vibration of the running vehicle, rolling and pitching of motor vehicle by steering, or tilt of the vehicle on the uphill slope and the downhill slope, a navigation information image of route such as right turning position and indicated by an arrow or the like of a traveling direction is largely deviated to the picture obtained by capturing the real landscape. Consequently, the arrow indicates a wrong direction substantially, and the right turning position is displayed unclearly.

For example, in an example shown in FIG. 13, an arrow 901 as a navigation information image appears to indicate the left turning position on the road in the landscape ahead of the vehicle clearly. However, in the case of a general passenger car, or even in the case of a vehicle such as a bus and a track with the driver seat located in a high position, there is no possibility that the road landscape actually seen through the windshield from the driver seat of the vehicle becomes a bird's-eye view down from a high position as shown in FIG. 13. In other words, except for a driver seat located in an extremely high position being 10 m or more high from the ground such as a cockpit of a jumbo jet that is unlikely to exist as a driver seat of a motor vehicle, it is not possible actually to capture the road picture in the landscape in which buildings and houses are crammed side by side as the bird's-eye view with which even turning points and back roads of the buildings can be seen as shown in FIG. 13. In reality, in the case of a general motor vehicle in which the driver's visual line is located only at about 1 m high, or in the case of a general vehicle such as a large truck and a bus in which the driver's visual line is located only at about 2 to 3 m high at the maximum, as an example in FIG. 14, the road picture often results in a landscape (and real picture) in which anteroposterior density is particularly high and a road that crosses the road in the traveling direction is not easily seen since such a road is hidden by the buildings and the like along the road in the traveling direction.

FIGS. 15A and 15B show comparative schematic views. FIG. 15A shows the degree of change (ΔLA) of a projection image onto a road surface with respect to the unit angle change (posture to the road surface) Δθe in the visual line at about 1 m high from a driver seat of a general vehicle. FIG. 15B shows the degree of change (ΔLB) of a projection image onto a road surface with respect to the unit angle change (posture to the road surface) Δθe in the visual line at about 10 m high, which is higher than the height in FIG. 15A. As shown in FIGS. 15A and 15B, comparing the degree of change of the projection image from the lower position (corresponding to the position deviation degree to the posture change Δθe in the case of capturing the image from the lower position) ΔLA to the degree of change of the projection image from the higher position (corresponding to the position deviation degree to the posture change Δθe in the case of capturing the image from the higher position) ΔLB, it is apparent that the relation thereof is expressed as ΔLA>>LB. Therefore, when the navigation information is superimposed on the real picture in a fixed position as shown in Patent document 1, due to posture change of the vehicle and posture change of the vehicle relative to the road resulting from a three-dimensional shape or the like of the road such as one-way grade (cant), it is often the case that the display position of the navigation information is largely deviated from the appropriate display position of the navigation information in the real picture. In the result, it is difficult or not possible that a user (driver) intuitively and accurately comprehends what position in the landscape the navigation information indicates.

More specifically, in the technique as Patent document 1 in which the navigation information such as the arrow is located in a fixed position such as on the central line on the screen of the real picture of the landscape, even if the posture of the vehicle is changed slightly, the deviation between the real picture of the landscape and the image of the navigation information becomes large. In addition, it is often the case that the landscape located near the vehicle along the road such as buildings and trees blocks the landscape located farther than the foregoing landscape. Therefore, to address such a problem, it is necessary to display the image of the navigation information on a more accurate position. However, it is not possible to take such a measure in Patent document 1.

Further, in general, in a movable body such as a motor vehicle, the posture thereof is in reality frequently changed due to rolling, pitching and the like of the vehicle while moving. Furthermore, for the foregoing reason, in the landscape viewed from only about 1 to 3 m high of a general vehicle, even slight posture change results in large position deviation. Therefore, in the technology of Patent document 1, there is a possibility that the following state is frequently caused. That is, the display position of the navigation information such as an arrow indicating the route is largely deviated from the appropriate display position in the real picture.

Furthermore, such posture change often varies according to each vehicle type, for example, according to difference of the barycentric position dominantly determined by the structure of a vehicle driving method or the like and the arrangement position of the engine. Therefore, it is necessary to address such posture change differently according to the vehicle type, the degree and the direction of the posture change. However, it is not possible to take such a measure in Patent document 1. Further, in the case of a two-wheeled vehicle and a scooter that pass a curved line by largely tilting the body for motor vehicle and the driver's body, the posture change of the vehicle becomes more significant. Therefore, in the case of the navigation system for such a two-wheeled vehicle, deviation of the display position resulting from the posture change of the vehicle becomes more significant.

Thirdly, it is desirable that a place as a promising eyemark for navigation such as a road name, a landmark, and a route guide of a hospital or the like that are attached to road map data is displayed three dimensionally in real time based on the current position of the vehicle. However, such an aspect is not totally considered or proposed in Patent document 1. Furthermore, as an example shown in FIG. 14, it is often the case that the building as an eyemark along the road is hardly seen since, such a building is hidden by the building and the landscape near the vehicle.

In the technique of Patent document 2, there is the following problem in addition to the problems similar to those of the Patent document 1 described above. That is, in Patent document 2, the real picture of the road landscape ahead of the vehicle is only displayed in the sub-screen. Therefore, matching of the road map information and the real picture should be made by the driver in his/her mind. Therefore, for example, when the driver drives a road with many crossings and forks in an unfamiliar (or firstly driving) place, it is difficult to intuitively comprehend the navigation information. In the result, there is a possibility that the user takes a wrong route, falsely recognizes the content indicated by the navigation information, and is not able to understand the content.

The technique of Patent document 3 has the following problems. That is, in such a technique, there is no specific road shape model. Therefore, in the case of a multilane road, there is a possibility that large deviation is caused between the central line of the driving lane of the vehicle extracted from the image data and the road centerline estimated from the road map data. Further, it is not possible to estimate information of the driving lane of the vehicle. Thus, accurate navigation information is not able to be provided in changing the lane and in turning left or right.

Further, such a technique does not consider the road structure that the one-way grade (cant) of the traveling road surface is set to be changed according to the horizontal curvature. Therefore, in the curved road, the estimation result of the posture data to the road surface of the lane adjacent to the driving lane of the vehicle is largely changed. In the result, there is a possibility that the road shape is not estimated accurately.

Further, in extracting the road characteristics from the image, the estimation result of the road shape is not feed backed, and the section with large luminance change is simply extracted as a white line by a differential filter for every frame. However, the estimation result obtained by the foregoing method is largely subject to influences of various environmental factors such as weather change and shadow or dirt on the road surface. Therefore, the road shape model expressed by the data obtained by extracting the road characteristics may become an incorrect model that is significantly deviated from the road shape of the real object.

Further, when the image of the navigation information is composited and displayed in the real picture in front of the vehicle, there is a possibility as follows. For example, the image of the navigation information is superimposed on a caution-needed picture such as a pedestrian and other obstruction in the real picture. Thereby, the visibility of the caution-needed picture may be inhibited.

In view of the foregoing, it is an object of the invention to provide a navigation information display method and a movable-body navigation information display unit. In the navigation information display method and the movable-body navigation information display unit, navigation information such as a course guide, a vehicle position, and map information is accurately projected and displayed in an appropriate position in a real picture or in a real landscape of the road ahead of the movable body. Thereby, a driver can intuitively and accurately recognize a relation between the navigation information and the real picture or the real landscape. In addition, visibility of a caution-needed picture such as a pedestrian in the real picture and a real picture of a road construction site is not blocked by the image of the navigation information.

A first movable-body navigation information display method according to the invention includes the steps of detecting a current position of a movable body, and capturing a real picture with an object of a landscape including a road in a traveling direction of the movable body by an in-vehicle camera set in the movable body; reading navigation information on travel of the movable body corresponding to the detected current position of the movable body from navigation information previously stored in association with road map data; creating a road shape model of a road assumed to be captured from the current position, based on the current position of the movable body and the road map data; extracting road shape data as image data of the road included in the landscape from the real picture; matching data of the road shape model with the road shape data to estimate posture data of the in-vehicle camera or the movable body to the road as the object, and determining a display position in the captured real picture of the navigation information read according to the current position of the movable body based on the posture data; and displaying an image in which the read navigation. information is composited with display dimensions and tone set by a user in the determined position in the captured real picture.

A first movable-body navigation information display unit according to the invention includes: a current position detecting means for detecting a current position of a movable body; a capturing means for capturing a real picture with an object of a landscape including a road in a traveling direction of the movable body by an in-vehicle camera set in the movable body; a data processing means for reading navigation information on travel of the movable body corresponding to the detected current position of the movable body from navigation information previously stored in association with road map data, creating a road shape model of a road assumed to be captured from the current position based on the current position of the movable body and the road map data, extracting road shape data as image data of the road included in the landscape from the real picture, matching data of the road shape model with the road shape data to estimate posture data of the in-vehicle camera or the movable body to the road as the object, determining a display position in the captured real picture of the navigation information read according to the current position of the movable body based on the posture data, and outputting data for displaying an image in which the read navigation information is composited as an image displayed with display dimensions and tone set by a user in the determined position in the captured real picture; and an image display means for compositing and displaying the read navigation information as the image displayed with the display dimensions and the tone set by the user in the determined position of the captured real picture based on the data outputted from the data processing means.

In the first movable-body navigation information display method or in the first movable-body navigation information display unit according to the invention, the road shape model of the road assumed to be captured from the current position is created based on the current position of the movable body such as a motor vehicle and the road map data including the current position. In addition, the road shape data as the image data of the road included in the landscape ahead of the vehicle or in the traveling direction is extracted from the real picture. The data of the road shape model is matched with the road shape data to estimate the posture data of the in-vehicle camera or the movable body to the road in the landscape as the object. Then, based on the posture data, the appropriate display position in the captured real picture of the navigation information read according to the current position of the movable body is determined. In the result, the image in which the read navigation information is composited with the display dimensions and the tone set by the user is displayed in the determined appropriate position of the captured real picture.

As mentioned above, the appropriate composite position of the navigation information in the real picture is determined by matching the data of the road shape model with the road shape data. Thereby, for example, display is enabled so that the navigation information such as a course guide, a position of a vehicle, and map information is projected accurately in an appropriate position in a real picture of a road ahead of the movable body or a real landscape. In the result, a driver can intuitively and accurately recognize a relation between the navigation information and the real picture or the real landscape. In addition, the display dimensions and the tone of the image (generically referred to as image, including character information and the like) of the navigation information composited in the real picture can be set as appropriate according to the user's option. Therefore, deterioration of visibility of the entire image in which the image of the navigation information is composited in the real picture is avoided. In addition, the user her/himself can customize the image of the navigation information to obtain the image with higher visibility for the user.

A second movable-body navigation information display method according to the invention includes the steps of: detecting a current position of a movable body, and capturing a real picture with an object of a landscape including a road in a traveling direction of the movable body by an in-vehicle camera set in the movable body; reading navigation information on travel of the movable body corresponding to the detected current position of the movable body from navigation information previously stored in association with road map data; creating a road shape model of a road assumed to be captured from the current position, based on the current position of the movable body and the road map data; extracting road shape data as image data of the road included in the landscape from the real picture; matching data of the road shape model with the road shape data to estimate posture data of the in-vehicle camera or the movable body to the road as the object, and determining a display position in the captured real picture of the navigation information read according to the current position of the movable body based on the posture data; and previously defining three classifications of warning information, guidance information, and additional information depending on urgency of display necessity for the navigation information, previously determining priority for each classification, determining to which classification the navigation information corresponds, and compositing and displaying the navigation information in the determined position in the captured real picture according to an order corresponding to the classifications.

A second movable-body navigation information display unit according to the invention includes: a current position detecting means for detecting a current position of a movable body; a capturing means for capturing a real picture with an object of a landscape including a road in a traveling direction of the movable body by an in-vehicle camera set in the movable body; a data processing means for reading navigation information on travel of the movable body corresponding to the detected current position of the movable body from navigation information previously stored in association with road map data, creating a road shape model of a road assumed to be captured from the current position based on the current position of the movable body and the road map data, extracting road shape data as image data of the road included in the landscape from the real picture, matching data of the road shape model with the road shape data to estimate posture data of the in-vehicle camera or the movable body to the road as the object, determining a display position in the captured real picture of the navigation information read according to the current position of the movable body based on the posture data, previously defining three classifications of warning information, guidance information, and additional information depending on urgency of display necessity for the navigation information, previously determining priority for each classification, determining to which classification the navigation information corresponds, and outputting data for compositing and displaying the navigation information as an image in the determined position in the captured real picture according to an order corresponding to the classifications and; an image display means for compositing and displaying the image of the read navigation information in the determined position of the captured real picture according to the order corresponding to the classifications, based on the data outputted from the data processing means.

In the second movable-body navigation information display method or in the second movable-body navigation information display unit according to the invention, as in the first movable-body navigation information display method or in the first movable-body navigation information display unit according to the invention, the appropriate composite position of the navigation information in the real picture is determined by matching the data of the road shape model with the road shape data. Thereby, for example, display is enabled so that the navigation information such as a course guide, a position of a vehicle, and map information is projected accurately in an appropriate position in a real picture of a road ahead of the movable body or a real landscape. In the result, a driver can intuitively and accurately recognize a relation between the navigation information and the real picture or the real landscape. In addition, the image of the read navigation information is composited and displayed according to the order corresponding to the classification based on the priority described above. Therefore, many navigation information images are inhibited from being displayed in one real picture. Consequently, deterioration of visibility of the entire image in which the image of the navigation information is composited in the real picture is avoided.

The navigation information other than the foregoing warning information may be displayed on and after when the current position of the movable body to a warning target in the real picture enters within a given distance. Thereby, the data processing amount for creating the image of the navigation information is saved. In addition, a navigation information image necessary for the user can be displayed timely when such navigation information becomes really necessary for the user.

A third movable-body navigation information display method according to the invention includes the steps of: detecting a current position of a movable body, and capturing a real picture with an object of a landscape including a road in a traveling direction of the movable body by an in-vehicle camera set in the movable body; reading navigation information on travel of the movable body corresponding to the detected current position of the movable body from navigation information previously stored in association with road map data; creating a road shape model of a road assumed to be captured from the current position, based on the current position of the movable body and the road map data; extracting road shape data as image data of the road included in the landscape from the real picture; matching data of the road shape model with the road shape data to estimate posture data of the in-vehicle camera or the movable body to the road as the object, and determining a display position in the captured real picture of the navigation information read according to the current position of the movable body based on the posture data; and displaying an image in which the read navigation information is composited in the determined position in the captured real picture, and displaying the navigation information other than graphic display for guiding the traveling direction not in a region under a virtual vanishing point or a virtual horizon line in the real picture but in a region above the virtual vanishing point or the virtual horizon line.

A third movable-body navigation information display unit according to the invention includes: a current position detecting means for detecting a current position of a movable body; a capturing means for capturing a real picture with an object of a landscape including a road in a traveling direction of the movable body by an in-vehicle camera set in the movable body; a data processing means for reading navigation information on travel of the movable body corresponding to the detected current position of the movable body from navigation information previously stored in association with road map data, creating a road shape model of a road assumed to be captured from the current position based on the current position of the movable body and the road map data, extracting road shape data as image data of the road included in the landscape from the real picture, matching data of the road shape model with the road shape data to estimate posture data of the in-vehicle camera or the movable body to the road as the object, determining a display position in the captured real picture of the navigation information read according to the current position of the movable body based on the posture data, and outputting data for compositing and displaying the navigation information other than graphic display for guiding the traveling direction not in a region under a virtual vanishing point or a virtual horizon line in the real picture but in a region above the virtual vanishing point or the virtual horizon line; and an image display means for compositing and displaying the read navigation information in the determined position of the captured real picture based on the data outputted from the data processing means.

In the third movable-body navigation information display method or in the third movable-body navigation information display unit according to the invention, as in the first movable-body navigation information display method or in the first movable-body navigation information display unit according to the invention, the appropriate composite position of the navigation information in the real picture is determined by matching the data of the road shape model with the road shape data. Thereby, for example, display is enabled so that the navigation information such as a course guide, a position of a vehicle, and map information is projected accurately in an appropriate position in a real picture of a road ahead of the movable body or a real landscape. In the result, a driver can intuitively and accurately recognize a relation between the navigation information and the real picture or the real landscape. In addition, the navigation information other than graphic display for guiding the traveling direction is not displayed in the region under the virtual vanishing point or the virtual horizon line in the real picture but in the region above the virtual vanishing point or the virtual horizon line. Consequently, visibility of the real picture of a road and a surface ground is not inhibited by display of the navigation information.

A fourth movable-body navigation information display method according to the invention includes the steps of: detecting a current position of a movable body, and capturing a real picture with an object of a landscape including a road in a traveling direction of the movable body by an in-vehicle camera set in the movable body; reading navigation information on travel of the movable body corresponding to the detected current position of the movable body from navigation information previously stored in association with road map data; creating a road shape model of a road assumed to be captured from the current position, based on the current position of the movable body and the road map data; extracting road shape data as image data of the road included in the landscape from the real picture; matching data of the road shape model with the road shape data to estimate posture data of the in-vehicle camera or the movable body to the road as the object, and determining a display position in the captured real picture of the navigation information read according to the current position of the movable body based on the posture data; and compositing and displaying the read navigation information as a three-dimensional icon that rotates centering on a vertical axis or a horizontal axis in the determined position in the captured real picture.

A fourth movable-body navigation information display unit according to the invention includes: a current position detecting means for detecting a current position of a movable body; a capturing means for capturing a real picture with an object of a landscape including a road in a traveling direction of the movable body by an in-vehicle camera set in the movable body; a data processing means for reading navigation information on travel of the movable body corresponding to the detected current position of the movable body from navigation information previously stored in association with road map data, creating a road shape model of a road assumed to be captured from the current position based on the current position of the movable body and the road map data, extracting road shape data as image data of the road included in the landscape from the real picture, matching data of the road shape model with the road shape data to estimate posture data of the in-vehicle camera or the movable body to the road as the object, determining a display position in the captured real picture of the navigation information read according to the current position of the movable body based on the posture data, and outputting data for displaying an image in which the read navigation information is composited as a three-dimensional icon that rotates centering on a vertical axis or a horizontal axis in the determined position in the captured real picture; and an image display means for compositing and displaying the read navigation information as the three-dimensional icon that rotates centering on the vertical axis or the horizontal axis in the determined position in the captured real picture based on the data outputted from the data processing means.

In the fourth movable-body navigation information display method or in the fourth movable-body navigation information display unit according to the invention, as in the first movable-body navigation information display method or in the first movable-body navigation information display unit according to the invention, the appropriate composite position of the navigation information in the real picture is determined by matching the data of the road shape model with the road shape data. Thereby, for example, display is enabled so that the navigation information such as a course guide, a position of a vehicle, and map information is projected accurately in an appropriate position in a real picture of a road ahead of the movable body or a real landscape. In the result, a driver can intuitively and accurately recognize a relation between the navigation information and the real picture or the real landscape. In addition, the image of the navigation information is composited and displayed in the real picture as the rotatable three-dimensional icon that rotates centering on the vertical axis or the horizontal axis. Consequently, visibility of the real picture of a road and a surface ground is not inhibited by display of the navigation information.

The foregoing navigation information may be, for example, at least one of a course guide of a route to reach a destination of the movable body, a position of a vehicle, a driving lane of the vehicle, and a building as an eyemark for a driver of the movable body to check the course guide or the position of the vehicle.

When the navigation information is information of a character, a symbol, or a number, the information may be iconified, and the icon image may be composited and displayed in the captured real picture.

Further, in the foregoing step of performing the data processing or the foregoing data processing means, the navigation information may be expressed as a virtual object in the three-dimensional augmented reality space, and a corresponding position in the road shape data converted into the two-dimensional characteristics space may be assigned to the expressed navigation information based on already obtained posture data. Thereby, the image of the navigation information can be composited in the real picture as a virtual object. In the result, the navigation information composed of a character, a symbol, or a number for a building as an eyemark of the course guide can be expressed visually and intuitively, even when the building as the eyemark is hidden by the building or the like in front of the building as the eyemark or is hidden by a curved road.

Further, in the foregoing step of performing the data processing or the foregoing data processing means, it is possible that the road shape data is converted to image data in a perspective two-dimensional characteristics space and the data of the road shape model is converted to image data in the perspective two-dimensional characteristics space, and the two-dimensional road shape data is matched with the two-dimensional data of the road shape model in the two-dimensional characteristics space to estimate the posture data of the in-vehicle camera or the movable body to the road surface as the object. Thereby, matching the road shape data with the data of the road shape model performed for estimating the posture data can be made with the use of 2 pieces of the two-dimensional data in the pseudo-three-dimensional two-dimensional characteristics space, without use of a method assumed to lead to the case that the information amount is enormously large and high speed processing of data becomes difficult such as a method using 2 pieces of three-dimensional data in the three-dimensional logical space. Therefore, the matching process can be simplified and the speed thereof can be accelerated.

Further, in the foregoing step of performing the data processing or the foregoing data processing means, it is possible that in creating the road shape model, the road shape model of a multilane road may be created by performing modeling while considering a road structure in which one-way grade of a traveling road surface in a curved road is set to change according to a horizontal curvature of the curved road. Thereby, even when a movable body such as a motor vehicle is traveling on the multilane road, the road shape of the multilane road can be accurately comprehended. In the result, it is possible to synthesize and display the navigation information in an appropriate position accurately corresponding to such a road shape of the multilane road.

Further, in the foregoing step of performing the data processing or the foregoing data processing means, it is possible that an existence probability of a road white line included in the landscape is obtained from the real picture and an RSL value is calculated by using a road shaped look-up table (RSL), the posture data is obtained so that an evaluation value based on the RSL value becomes the maximum, and thereby the data of the road shape model is matched with the road shape data. Thereby, it is possible to always extract accurate road shape data without being adversely influenced by various environmental factors such as weather change and shadow or dirt of the road surface. In the result, accurate posture data can be estimated by using the extracted data.

Further, in the foregoing step of displaying the image or the foregoing image display means, it is possible to display the image in which the read navigation information is composited in the determined appropriate position in the captured real picture on a given display screen of the display unit such as a liquid crystal display panel for car navigation set in the almost central portion of the dashboard or the like.

Otherwise, it is also possible that the image in which the read navigation information is composited in the determined position in the captured real picture is projected and displayed on the internal surface of a transparent window in front of the driver seat by a display unit such as a so-called HUD (Head Up Display) projection device.

Further, it is also adopt the following aspect or the like. That is, in the foregoing step of performing the data processing or the foregoing data processing means, the navigation information corresponding to the detected current position of the movable body is read from the navigation information previously stored in association with the road map data, the road shape model of the road assumed to be captured from the current position is created based on the current position of the movable body and the road map data, the road shape data as the image data of the road included in the landscape is extracted from the real picture, the data of the road shape model is matched with the road shape data to estimate the posture data of the in-vehicle camera or the movable body to the road as the object, the display position in the captured real picture of the navigation information read according to the current position of the movable body is determined based on the posture data, and the data for displaying the image of the read navigation information in the determined position is outputted. In addition, in the foregoing image display means or in the foregoing step of displaying the image, the image of the navigation information is projected and displayed on the internal surface of the transparent window in front of the driver seat of the movable body, and thereby the image of the navigation information is composited and displayed in the landscape seen through the transparent window in front of the driver seat.

As described above, according to the movable-body navigation information display method or the movable-body navigation information display unit of the invention, the road shape model of the road assumed to be captured from the current position is created based on the current position of the movable body such as a motor vehicle and the road map data including the current position, the road shape data as the image data of the road included in the landscape ahead of the vehicle or in the traveling direction is extracted from the real picture, the data of the road shape model is matched with the road shape data to estimate the posture data of the in-vehicle camera or the movable body to the road in the landscape as the object, the appropriate display position in the captured real picture of the navigation information read according to the current position of the movable body is determined based on the posture data, and the image in which the read navigation information is composited in the determined appropriate position in the captured real image is displayed. Therefore, for example, the navigation information such as a course guide, a vehicle position, and map information can be accurately projected and displayed in an appropriate position in the real picture or in the real landscape of the road ahead of the movable body. Thereby, the driver can intuitively and accurately recognize a relation between the navigation information and the real picture or the real landscape. In addition, visibility of a caution-needed picture such as a pedestrian in the real picture and a real picture of a road construction site is not inhibited by the image of the navigation information. Consequently, the visibility can be favorable over the entire display image.

BRIEF DESCRIPTION OF THE DRAWINGS

FIGS. 2A to 2D are views showing a relative position relation among three-dimensional vehicle coordinate system VCS, three-dimensional camera coordinate system CCS, and two-dimensional projection image coordinate system ICS;

FIG. 3 is a view showing an example of mapping composed of dots and lines expressed by road map data;

FIG. 7 is a diagram showing various mathematical formulas together that are used for various calculations performed in the central processing section;

BEST MODE FOR CARRYING OUT THE INVENTION

An embodiment of the invention will be hereinafter described in detail with reference to the drawings.

Figure 1:
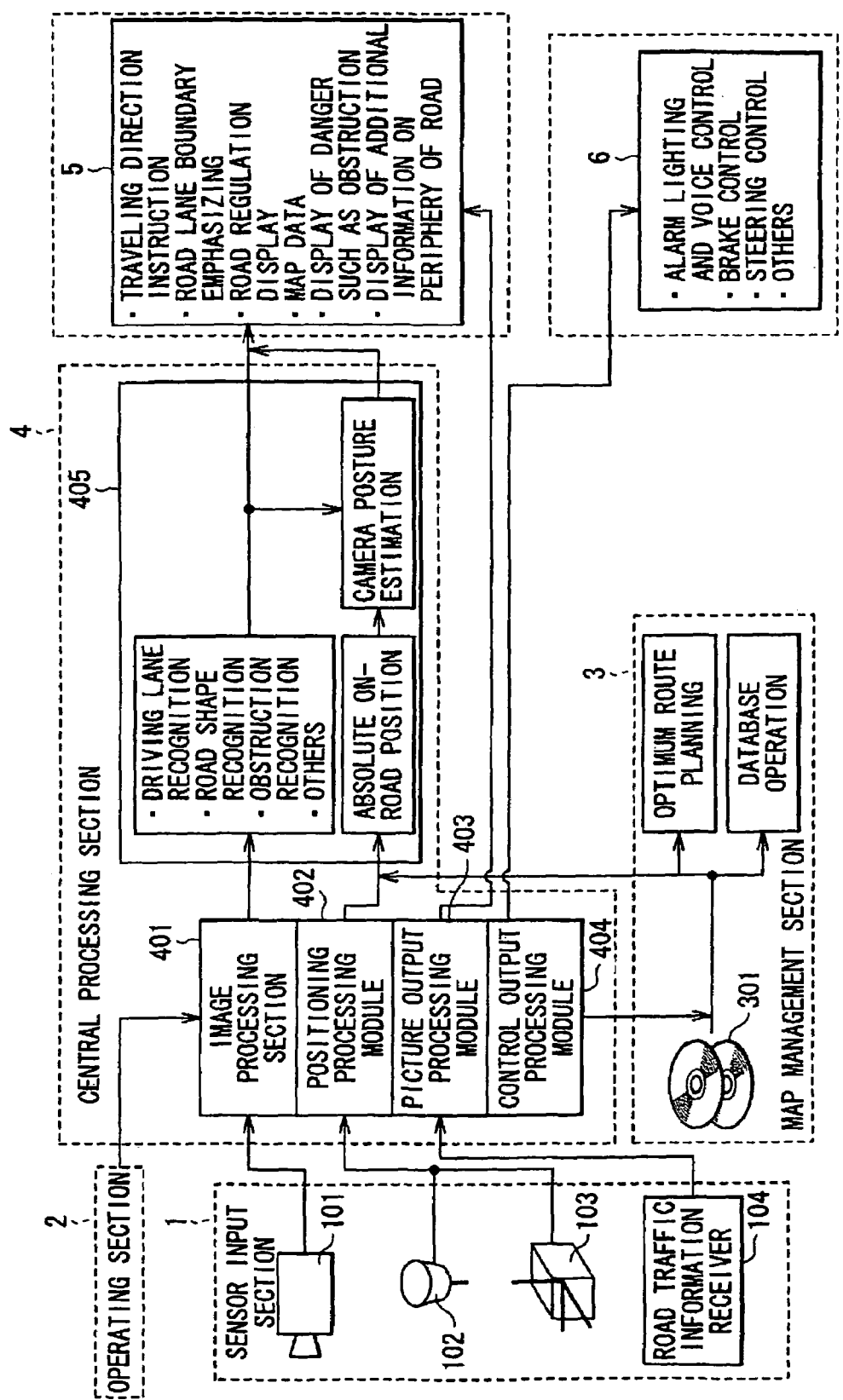
FIG. 1 is a diagram showing an outline structure of a movable-body navigation information display unit according to an embodiment of the invention.

FIG. 1 shows an outline structure of a movable-body navigation information display unit of the invention. A movable-body navigation information display method according to an embodiment of the invention is embodied by operations or functions of the movable-body navigation information display unit. Therefore, a description will be given of both the movable-body navigation information display unit and the movable-body navigation information display method together.

The movable-body navigation information display unit includes a sensor input section 1, an operating section 2, a map managing section 3, a central processing section 4, a picture display section 5, and a controlling section 6 as the main sections.

More specifically, the sensor input section 1 includes a CCD (solid-state image sensing device) camera 101, a GPS sensor 102, an INS sensor 103, and a VICS 104. The CCD camera 101 is set on the dashboard of the driver seat or in the vicinity of the ceiling (not shown) in a movable body such as a motor vehicle (hereinafter referred to as vehicle or the movable body) in which the movable-body navigation information display unit is mounted, so that the CCD camera 101 shoots (captures) a landscape ahead of the vehicle at the camera angle almost similar to the visual line of a driver seeing the landscape through the windshield. The CCD camera 101 is, for example, a fixed focal length monocled type camera. The CCD camera 101 captures an image of the landscape ahead of the vehicle including a road, and takes in an image signal thereof. The taken image signal is transmitted as data to an image memory (not shown) in the central processing section 4. Traveling direction data and speed data of the movable body acquired by the GPS sensor 102 and the INS sensor 103 is transmitted to the central processing section 4, while being synchronized with the image data acquired by the CCD camera 101. Data received by the VICS 104 as a road traffic information receiver is also transmitted to the central processing section 4.

The operating section 2 transmits a command such as system setting and mode change to the central processing section 4 in response to an operation instruction inputted by a user through a button operation, a remote controller input apparatus (not shown) or the like.

In accordance with a reading command by the central processing section 4, the map managing section 3 reads various information of a road position designated by a command input through the operating section 2 from map data CD 301 that previously records map data in a given geographic region, and transmits read data to the central processing section 4.

The central processing section 4 includes four modules composed of an image processing module 401, a positioning processing module 402, a picture output processing module 403, and a control output processing module 404 and an image data creating section 405 as main sections thereof.

The image processing module 401 performs, for example, posture estimation of the mounted CCD camera 101, tracing of a driving lane, detection of an obstruction, and calculation of the distance between two vehicles.

The positioning processing module 402 matches the direction and the speed sent from the sensor input section 1 with the road map data of the map managing section 3, calculates accurate road position information, and outputs data thereof.

The picture output processing module 403 expresses a course guide, a vehicle position, and map information in the picture display section 5 as a virtual object in a three-dimensional augmented reality space, projects the virtual object on a two-dimensional road picture with the use of the posture parameter of the CCD camera 101 obtained by the aftermentioned estimation method, and integrates (composites) the virtual object in a real picture of the landscape ahead of the movable body. Further, the picture output processing module 403 creates data for, for example, emphatically displaying road sectional lines in the bad weather and displaying dangerous substances such as an obstruction. Furthermore, the picture output processing module 403 iconifies information of objects to be able to become an eyemark in route guide such as a landmark, a railroad station, a hospital, and a gas station as information to be added to the road map, and projects the iconified information on the real picture of the road by using the camera posture parameter.

The control output processing module 404. comprehensively determines each analysis result, and gives an alarm output instruction for outputting an alarm or the like corresponding to the degree of danger for the vehicle to the controlling section 6.

Based on the data mainly outputted from the image processing module and the positioning processing module and the map data read by the map managing section 3, for example, the image data creating section 405 recognizes the driving lane of the vehicle, a road shape, and an obstruction of currently driving vehicle, recognizes a vehicle's absolute on-road position, and estimates the camera posture. The image data creating section 405 thereby creates data for compositing and displaying the navigation information on an appropriate position in the real picture. More specifically, such display data is created based on the following three-dimensional modeling rules in the virtual space:

1. The landmark and facility information are displayed with a three-dimensional icon schematically expressing the landmark and the facility information.
2. Indicative information such as a traveling direction is displayed with a three-dimensional arrow.
3. Fundamentally, all navigation information can be changed by a user. However, it is needless to say that for each navigation information, the default display dimensions and the default color are previously specified. For example, the landmark indicating a hospital is set by default to be displayed with the use of a plate-like three-dimensional icon having a given area and a given thickness with the design consisting of a white cross on a red background. However, it is possible for the user to change the foregoing setting to a plate-like three-dimensional icon with the design consisting of a red and white cross on a white background. Such setting data is inputted by the user with the use of the operating section 2. The inputted such setting data is further inputted to the image data creating section 405 via the image processing module 401. Then, the image data creating section 405 creates data for displaying various navigation information with the dimensions and the color corresponding to each piece of the navigation information.
4. For the navigation information, three classifications of warning information, guidance information, and additional information are previously defined depending on urgency of display. Information of the definition is previously stored in the image data creating section 405. The warning information is information for warning the user of pullout of the lane, approximation of an obstruction (or possibility of crash) and the like. The guidance information is information or the like on a traveling direction to the destination, a park availability guide, and the landmark or a large facility along the road. The additional information is information on a medium and small sized facility, a shop and the like along the road. For the respective classification, priorities are previously determined. Information on the priorities is also previously stored in the image data creating section 405. Determination is made to which classification of the foregoing classifications the navigation information corresponds. In accordance with the order corresponding to the classification, the data for compositing and displaying each piece of the navigation information in a corresponding position in the real picture is created by the image data creating section 405.
5. The navigation information other than the warning information is displayed on and after when the current position of the movable body to a warning target in the real picture (or the real landscape in the case of HUD) enters within a given distance.
6. Of the navigation information, the navigation information other than the three-dimensional arrow for guiding the traveling direction and graphic display such as virtual road painting is not displayed in the region under a virtual vanishing point or a virtual horizon line in the real picture, but is displayed in the region above the virtual vanishing point or the virtual horizon line.
7. The navigation information is composited and displayed in a determined position in the captured real picture as a three-dimensional icon that rotates centering on a vertical axis or a horizontal axis. When multiple rotatable three-dimensional icons are displayed in one screen, each of the multiple rotatable three-dimensional icons is displayed while being rotated at the phase different from one another or at the rotational speed different from one another.
8. The navigation information is displayed as a translucent icon through which the real picture can be transparently viewed.
9. Of the navigation information, character information (information displayed as a character) is not displayed in the real picture, but displayed in a display region preset on the periphery of the real picture.

Based on the data created by the image data creating section 405, the picture display section 5 displays the picture (image) in which the navigation information is composited in the appropriate position of the real picture on the screen such as a liquid crystal display panel.

The controlling section 6, for example, controls outputting the alarm or the like corresponding to the foregoing alarm output instruction, controls voice output corresponding to the analysis result by the control output module, controls a brake, and controls steering by, for example, controlling operations of each servo motor system provided for adjusting the control amount thereof.

Next, a description will be given of operations of the movable-body navigation information display unit.

In the movable-body navigation information display unit, regarding the road map data of the geography in the vicinity of the vehicle including the current position of the vehicle, the image data creating section 405 creates a road shape model for a road assumed to be captured from the current position, based on current position data detected by the GPS sensor 102, the INS sensor 103, and the positioning processing module. In addition, road shape data as image data of a road included in a landscape in the traveling direction is extracted from the real picture, based on, for example, white line image data of a road traveling sectional line and the like.

Subsequently, the image data creating section 405 matches the road shape data with data of the road shape model data. Then, the image data creating section 405 estimates posture data of the CCD camera 101 (or posture data of the vehicle) to the road in the landscape as an object captured by the CCD camera 101.

Next, based on the posture data, an appropriate display position in the captured real picture of the navigation information read according to the current position of the movable body is determined. Then, image data that enables displaying an image in which the read navigation information is composited in the determined appropriate position in the captured real picture is created.

As above, the image data creating section 405 determines what position in the real picture the navigation information is appropriately composited by matching the data of the road shape model with the road shape data. Based on the image data created as above, the picture display section 5 can display the image in which the navigation information such as the route guide, the vehicle position, and the map information is appropriately composited in the appropriate position in the real picture of the road ahead of the movable body or in the real landscape seen through the windshield. In the result, according to the movable-body navigation information display unit of this embodiment, it is possible to display the picture with which the relation between the navigation information and the real picture/real landscape can be intuitively and accurately recognized by the driver.

The foregoing navigation information presents at least one of a course guide for a route to arrive at the destination of the movable body, the vehicle position, the driving lane of the vehicle, and the building as an eyemark for the driver of the movable body to check the course guide or the vehicle position. When the navigation information is information of a character, a symbol, or a number, it is desirable that the information is iconified, and the icon image is composited and displayed in the captured real picture.

Further, the image data creating section 405 expresses the navigation information as a virtual object in the three-dimensional augmented reality space, and assigns a corresponding position in the road shape data converted to the two-dimensional characteristics space to the expressed navigation information based on already obtained posture data and the like. Thereby, the image data creating section 405 composites the image of the navigation information as a virtual object in an appropriate position of the real picture. For example, the navigation information composed of a character, a symbol, or a number for a building as an eyemark of the course guide can be expressed visually and intuitively, even when the building as the eyemark is hidden by the building or the like in front of the building as the eyemark or is hidden by a curved road.

Further, the image data creating section 405 converts the road shape data to image data of the perspective two-dimensional characteristics space, and converts the data of the road shape model to image data of the perspective two-dimensional characteristics space. The image data creating section 405 matches the foregoing 2 pieces of two-dimensional data each other in the two-dimensional characteristics space, and estimates the posture data of the in-vehicle camera or the movable body to the road surface as an object. Since matching the road shape data with the data of the road shape model performed for estimating the posture data is made with the use of 2 pieces of the two-dimensional data in the pseudo-three-dimensional two-dimensional characteristics space, the matching process is simplified and the speed thereof is accelerated.

Further, when the road shape model is created, modeling is performed by considering the road structure in which the one-way grade of the traveling road surface in the curved road is set to change according to the horizontal curvature of the curved road. Thereby, even when the movable body such as a motor vehicle is traveling on a multilane road, the road shape of the multi-lane road can be accurately comprehended. Consequently, it is possible to composite and display the navigation information in an appropriate position accurately corresponding to the road shape of such a multilane road.

Further, in matching the data of the road shape model with the road shape data, the posture data of the movable body may be obtained as follows. That is, a road look-up table is used (RSL, reference: "Research on extracting and simultaneous tracing multiple movable bodies by visual motion interpretation of an in-vehicle camera," H U Zhencheng, doctoral thesis, Graduate school of Science and Technology, National University Corporation Kumamoto University). The existence probability of a road white line included in the landscape is obtained from the real picture, and thereby the RSL value is calculated. The posture data of the movable body is obtained so that the evaluation value based on the RSL value becomes the maximum. Thereby, it is possible to always extract accurate road shape data without being adversely influenced by various environmental factors such as weather change and shadow or dirt of the road surface. In the result, an accurate posture data can be estimated by using the extracted data.

Further, it is also possible to display the image in which the navigation information is composited in the determined appropriate position in the captured real picture on a given display screen of the display unit such as a liquid crystal display panel for car navigation set in the almost central section of the dashboard or the like.

Further, it is also possible that the image in which the read navigation information is composited in the appropriate position in the captured real picture determined by the foregoing matching is projected and displayed on the internal surface of a transparent window in front of the driver seat by a display unit such as a so-called HUD projection device.

Further, instead of compositing the image of the navigation information in the captured real picture, it is possible to take the following method. That is, by using data of the position determined as the appropriate position to display the image of the navigation information based on the foregoing matching, the image of the navigation information is HUD-projected and displayed on the internal surface of the windshield in front of the driver seat corresponding to the foregoing position. Thereby, the image of the navigation information is composited and displayed in the landscape seen through the transparent window in front of the driver seat.

Next, a description will be hereinafter given of more specific examples of the movable-body navigation information display unit and the movable-body navigation information display method according to this embodiment.

FIG. 2 shows a relative position relation among three-dimensional vehicle coordinate system VCS ($X_v$, $Y_v$, $Z_v$), three-dimensional camera coordinate system CCS ($X_c$, $Y_c$, $Z_c$), and two-dimensional projected image coordinate system ICS ($x_i$, $y_i$). The origin of the three-dimensional vehicle coordinate system VCS is located at the midpoint of the central line of the vehicle rear wheels. The axis $Z_v$ is set on the central line, the axis $X_v$ is set to be oriented leftward, and the axis $Y_v$ is set to be oriented upward, respectively. The origin of the three-dimensional camera coordinate system CCS is located at the central point of the lens of the CCD camera. The axis $Z_c$ is set to be overlapped on the optical axis of the camera. The two-dimensional projected image coordinate system ICS is located on the plane where Zc=fconst (plane where Zc=f).

The conversion relation from the camera coordinate system CCS to the image coordinate system ICS is orthogonal projection. Therefore, the relation can be described as the relational expression based on a matrix as shown in Formula 1 of FIG. 7. P is the coordinates [$X_c$, $Y_c$, $Z_c$, 1] in the CCS coordinate system, and p is the coordinates [$x_i$, $y_i$, 1] in the ICS coordinate system.

A is a 3×4 projection matrix, and can be generally decomposed as shown in Formula 2 of FIG. 7. K is called the parameter matrix inside the camera, and is determined by the image horizontal and vertical direction transformation ratio ($S_x$, Sy), the image central point (uo, vo), and the rotation transformation ratio Sθ. K is expressed as Formula 3 in FIG. 7.

The camera posture matrix M is called the parameter matrix outside the camera, and represents a conversion relation from a view point to the target model coordinate system. In general, the camera posture matrix M can be expressed as Formula 4 of FIG. 7 by three-dimensional translation and rotational conversion of a rigid body. R11 to R33 (all elements of R) represent the rotation parameters, and $T_x$, $T_y$, and $T_z$, (all elements of T) represent the translation parameters.

In general, the camera magnification can be approximated with 1. Therefore, based on formula 1 to formula 4, the restraint formula as shown in Formula 5 of FIG. 7 is established.

When 6 parameters of the rotation and the translation representing the camera posture are displayed by a posture vector, the projection relation between the image coordinate system and the vehicle coordinate system is expressed by the formula shown in Formula 6 of FIG. 7. That is, according to Formula 6, one pair of corresponding points in the 2D-3D space (p, P) determines one restriction formula as shown in Formula 6 of FIG. 7 to the camera posture data. Theoretically, such 6 pairs of corresponding points are enough to estimate the camera posture.

However, it is theoretically very difficult or not possible to accurately and surely estimate the depth of the three-dimensional space only by monochrome real image data of the landscape ahead of the vehicle that is captured by the simple monocular CCD camera. Therefore, in this example, a multilane road shape model is estimated from road map information by avoiding the matching in 2D-3D (matching of the two-dimensional space with the three-dimensional space). The estimated multilane road shape model is matched with multilane road shape data extracted from real picture data in the 2D-2D characteristics space. Then, the camera posture data is estimated by such matching in the two-dimensional space to the two-dimensional space. However, it is needless to say that the matching is not limited to the matching in the 2D-2D characteristics space. It is needless to say that, for example, it is also possible to perform estimation and matching as follows. That is, the depth data in the three-dimensional space is accurately and surely estimated from an information source other than the real image data of the landscape ahead of the vehicle, and matching of the two-dimensional space to the three-dimensional space is made by using such data. However, in that case, it is needless to say that in general, the data amount to be processed tends to become larger than that of the case of matching in the 2D-2D characteristics space.

FIG. 3 shows an example of a mapping with the use of dots and lines expressed by the road map data. In the road map data, three-dimensional position information such as the latitude, the longitude, and the altitude of a road segment generally called a node, a road name, a road class, the number of lanes, a crossing state and the like are recorded. The road width can be estimated based on the road class. Further, in general, a node position described in the map data is located on the road centerline. In general, the structure of the road is composed of a complex curved surface using the horizontal curvature and the vertical curvature.

Figure 4:
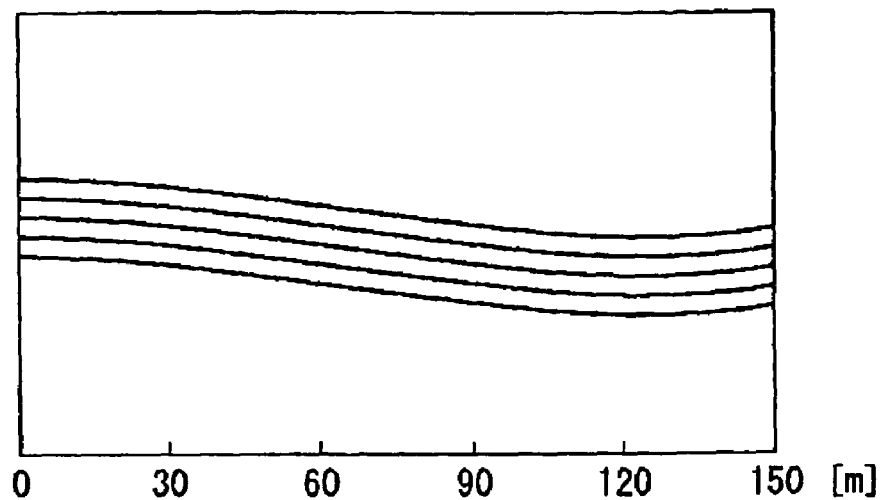
FIG. 4 is a diagram showing a road segment horizontal shape model obtained by approximation with the clothoid curved line.

FIG. 4 shows a road segment horizontal shape model obtained by approximation with the clothoid curved line. Such a road segment horizontal shape model can be modeled by using the mathematical formula as shown in Formula 7 of FIG. 7. c0 and c1 in Formula 7 respectively represent the change parameters of the initial curvature and the curvature of the horizontal curved line. nli represents the number of up lanes, nri represents the number of down lanes, and wi represents the average road width between segments. Li represents the segment length. By using the model, the road shape model in a given road position can be structured simply and in a very short time based on the map data.

In general, in the country adopting the left-hand traffic such as Japan, the traveling position of vehicles is not on the road centerline, but is often deviated leftward from the road centerline. By using information on the road position of the vehicle (the displacement amount from the origin of the vehicle coordinate system to the center of the road) and the direction (the displacement angle made by the Z axis direction of the vehicle coordinate system and the road horizontal tangent line), the road horizontal shape model of the road centerline corresponding to the fact that the actual traveling position is deviated to the one lane side can be converted to a new model based on the vehicle coordinate system VCS.

Assuming that the road surface within the visible distance (region assumed to be captured as the real picture) is flat, the projection formula of the road horizontal shape model as shown in Formula 8 of FIG. 7 is estimated from Formula 6 of FIG. 7 as the projection conversion formula. In Formula 8 of FIG. 7, the three-dimensional road shape is projected perspectively and two dimensionally as it were. Therefore, the 2D-3D matching having a possibility to result in tangled data processing as a matching method to estimate the camera posture can be simplified to the 2D-2D matching.

Figure 5:
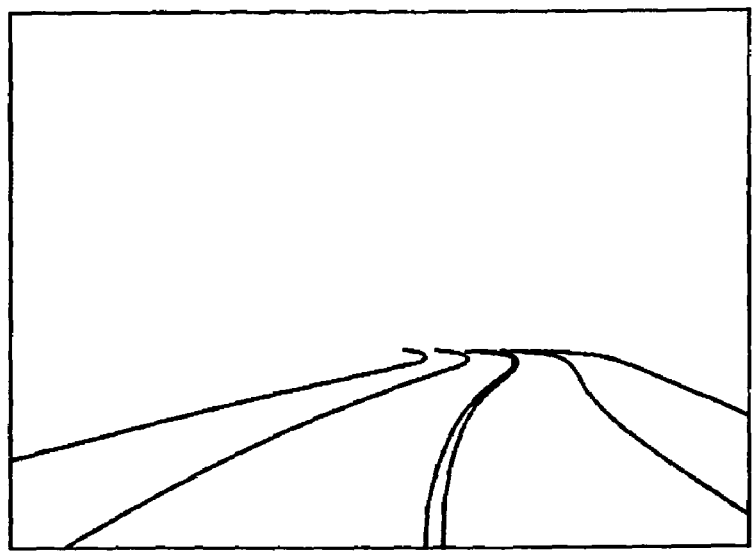
FIG. 5 is a view showing an example of a road horizontal shape model used in 2D-2D matching.

As above, in this example, the road shape model estimated from the road map data and the road shape data extracted from the real picture are 2D-2D matched in the two-dimensional characteristics space, and the optimal posture vector is estimated. FIG. 5 shows an example of the road horizontal shape model used for the 2D-2D matching.

In the actual road environment, it is often the case that a light irradiation state due to rays of the sun, artificial lighting and the like, a weather state and the like lead to large change of the brightness, the tint and the like of the road white line indicating the section of the lane. Therefore, in some cases, it is not possible to successfully and directly match the road shape model with the road shape data extracted from the real picture. Therefore, in this example, instead of the brightness value of the road white line, the existence probability thereof is picturized by using the concept of the road white line look-up table (RSL). Thereby, the high-speed and robust road shape matching can be realized.

As closer to the road white line, the higher the RSL value is. As a specific calculation method, first, the road white line, the sectional line, and a borderline prospect of the road region are extracted as a characteristics region, and the image is binarized (a pixel belonging to the characteristics region is 1, and the other pixels are 0). Then, by using Formula 9 shown in FIG. 7, the RSL value of each pixel is calculated. $\lambda$, x, and y are binarized pixel values. $\chi$, i, and j are the kernel coefficient for the RSL. To inhibit noise, the kernel size is generally set to 5 or 7. Each coefficient is determined by the Gaussin distribution formula. The final evaluation formula of the camera posture estimation is shown in Formula 10 of FIG. 7. $\eta\sigma$ is a set of two-dimensional projection points of the road horizontal shape model. By using Formula 10, it is possible to obtain the best RSL evaluation value for totally matching the road shape model created based on the road map data with the road shape data extracted from the real picture.

To obtain the optimal value of the posture vector $\sigma$ of the 6 parameters, various local extreme value search methods can be used. Of those methods, in particular, the direct search algorithm by Hooke and Jeeves can be suitably adopted (R. Hooke and T. Jeeves, "Direct search solution of numerical and statistical problems," Journal of the Association for Computing Machinery (ACM), pp. 212 to 229 (1961)).

The camera posture data obtained as above is used for data matching for determining the position in which the navigation information should be displayed. The camera posture data is also used for the next estimation as the feedback amount.

Figure 6:
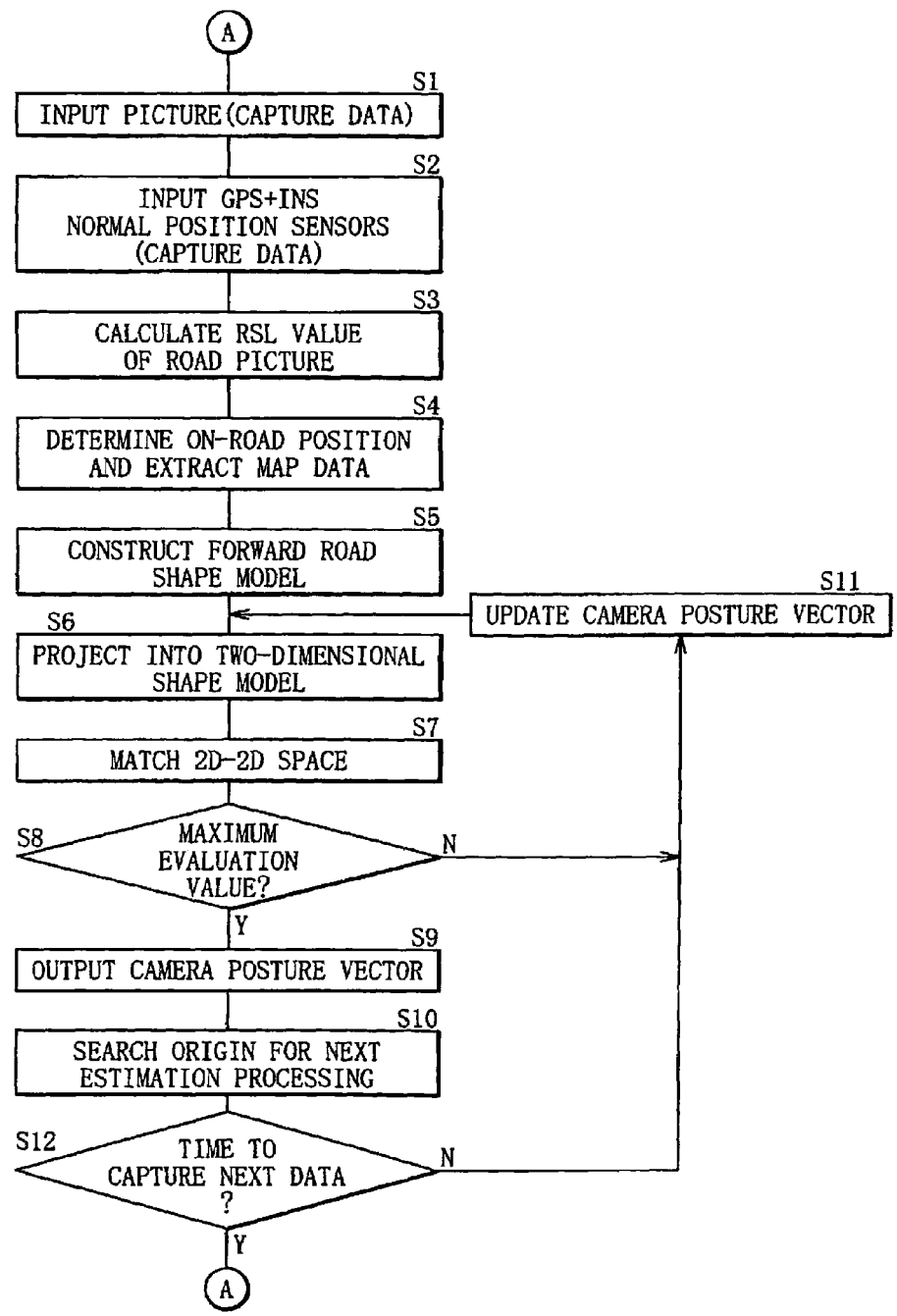
FIG. 6 is a flowchart showing a flow of a series of main processing including extracting road shape data, creating a road shape model, estimating a camera posture parameter and the like in a central processing section.

FIG. 6 is a flowchart showing a flow of a series of main processing including extracting the road shape date, creating the road shape model, estimating the camera posture parameter and the like in the central processing section.

First, the real picture data of the landscape including the road ahead of the vehicle took by the CCD camera is captured (S1).

Concurrently, in sync with captured real picture data, the data acquired by the GPS sensor and the INS sensor is captured (S2).

Next, a white line of the road traveling sectional line or the like and a sectional line region of a lane of a paved face or the like are extracted from the real picture data, and the RSL value is calculated (S3).

Further, the current position (absolute position) of the vehicle is obtained (detected) by so-called map matching, and the related map data corresponding to the current position is read out from information stored in the map data CD (S4).

The road horizontal shape model for the road in the landscape captured as the real picture is constructed (S5).

Based on the updated camera posture vector, the road horizontal shape model is projected in the perspective two-dimensional space (S6).

The RSL expression of the road picture is matched with the projected road horizontal shape model, and the evaluation value is obtained (S7).

Determination is made whether or not the obtained evaluation value is the maximum value (S8). If determining that the evaluation value is the maximum value (Y of S8), the posture vector then is outputted (S9), and the outputted value is feed backed as the search origin for the next estimation processing (S10). If determining that the evaluation value is not the maximum value (N of S8), the posture vector is updated by Hooke&Jeeves method (S11), and reevaluation is made (S11 to S6 through S8). This procedural loop is repeated until the maximum value is obtained (until Y of S8).

When it comes to the time to start processing of taking in the next data (Y of S12), the foregoing series of processing is executed again from the first step of capturing the data in the order similar to the foregoing order.

The matching is performed as above, and determination is made that what navigation is displayed in what position. Next, the image data creating section 405 creates the data for specifically displaying each piece of the navigation information. More specifically, creating such data is made based on the 9 types of the three-dimensional modeling rules 1 to 9 described above. In the result, the images shown as an example in FIG. 8 to FIG. 12 are displayed on the screen of the picture display section 5.

The landmark and the facility information are displayed with the three-dimensional icon expressing them schematically. In an example of FIG. 8, a three-dimensional icon 801 indicating existence of a "hospital" is composited and displayed in the vicinity of the hospital in the real picture. The three-dimensional icon 801 indicating the hospital has, for example, the design consisting of a white cross on a red background. The size (outer dimensions) and the tint thereof are set to the degree with which the visibility of the picture of the buildings and the road of the real picture as a background is not inhibited.

Figures 9A, 9B:
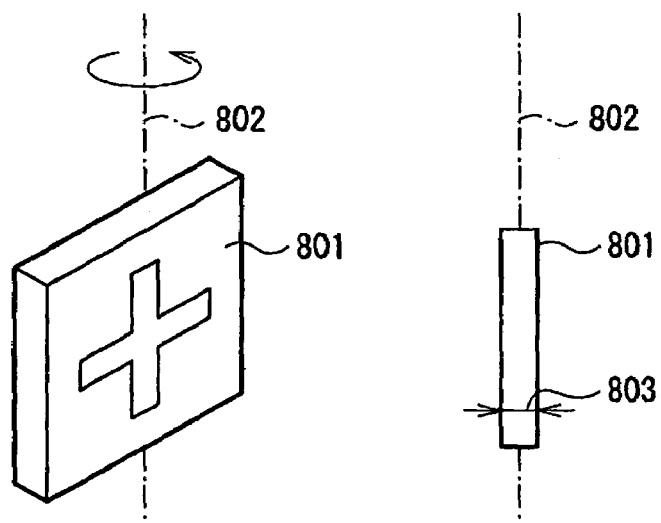
FIGS. 9A and 9B are schematic views showing rotation of a three-dimensional icon displayed in a composite image.

As shown in the enlarged view of FIGS. 9A and 9B, the three-dimensional icon 801 is displayed as if the icon 801 rotates at a given rotation speed centering on a vertical axis 802. When the three-dimensional icon 801 is oriented to the front face (FIG. 9A), a user can clearly recognize that the icon 801 indicates the "hospital." When the icon 801 is turned 90 deg from the state oriented to the front face, as shown in the enlarged view of FIG. 9B, only an extremely thin area of a thickness thereof 803 is displayed. Therefore, the icon does not inhibit visibility of the buildings, pedestrians, obstructions and the like in the real picture existing (or being displayed) behind the three-dimensional icon 801, and the user can clearly recognize the existence thereof.

As described above, fundamentally, it is possible for the user to change the display dimensions and the display color (use of color and tint) for all navigation information such as the three-dimensional icon 801.

Figure 8:
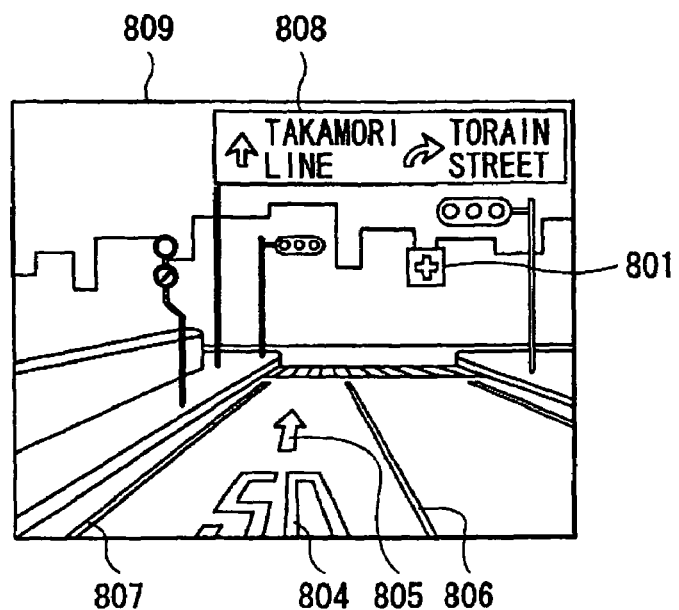
FIG. 8 is a view showing an example of an image finally displayed.

Indicative information such as the traveling direction is displayed with a three-dimensional arrow. In the example of FIG. 8, for example, on the road lane on which the user's vehicle currently goes straight ahead, a virtual road painting 804 indicating the limiting speed, a three-dimensional arrow 805 indicating the direction to travel, and virtual road paintings 806, 807 indicating the lane are composited and displayed in the real picture of the road. However, character information or the like for displaying the destination is not displayed to overlap on the region under a virtual vanishing point or the virtual horizon line in the real picture, that is, more specifically, on the road real picture.

In the example of FIG. 8, a destination display 808 mainly composed of the character information is displayed in the region of the real picture in which almost only the sky is shown that is located in the vicinity of the upper end of an entire real picture 809 (entire screen in the case of FIG. 8). As above, the image mainly composed of the character information such as the destination display 808 is not displayed in the region under the virtual vanishing point or the virtual horizon line in the real picture or the real landscape in which roads, pedestrians, and buildings exist with high probability. Thereby, it is possible to inhibit the real picture in which roads, pedestrians, and buildings exist or the real landscape from being hidden and invisible.

Further, as described above, the navigation information is composited and displayed in the determined position in the captured real picture as the three-dimensional icon that rotates centering on the vertical axis (or the horizontal axis). In the case that a plurality of three-dimensional icons are displayed on one screen, each of the plurality of three-dimensional icons may be rotated at the phase different from e one another or at the rotational speed different from one another. In an example shown in FIG. 12, a first three-dimensional icon 121 and a second three-dimensional icon 122 are displayed so that the icons are rotated in the same direction and at the same rotational speed but at the phase different from each other by about 90 deg.

By setting the phase different from each other by about 90 deg, when the first three-dimensional icon 121 is oriented to the front face, the second three-dimensional icon 122 is oriented to the side face, and only the first three-dimensional icon 121 is substantially viewed by the user. Meanwhile, when the second three-dimensional icon 122 is oriented to the front face, the first three-dimensional icon 121 is oriented to the side face, and only the second three-dimensional icon 122 is substantially viewed by the user. By limiting the number of the three-dimensional icons that can be viewed by the user at once as above, it is possible to avoid tangle and visibility deterioration of the display screen resulting from a state that the plurality of three-dimensional icons are seen in parallel at once. In addition to setting different phases, for example, it is possible to set the rotational speed of the plurality of three-dimensional icons different from each other.

Figure 10:
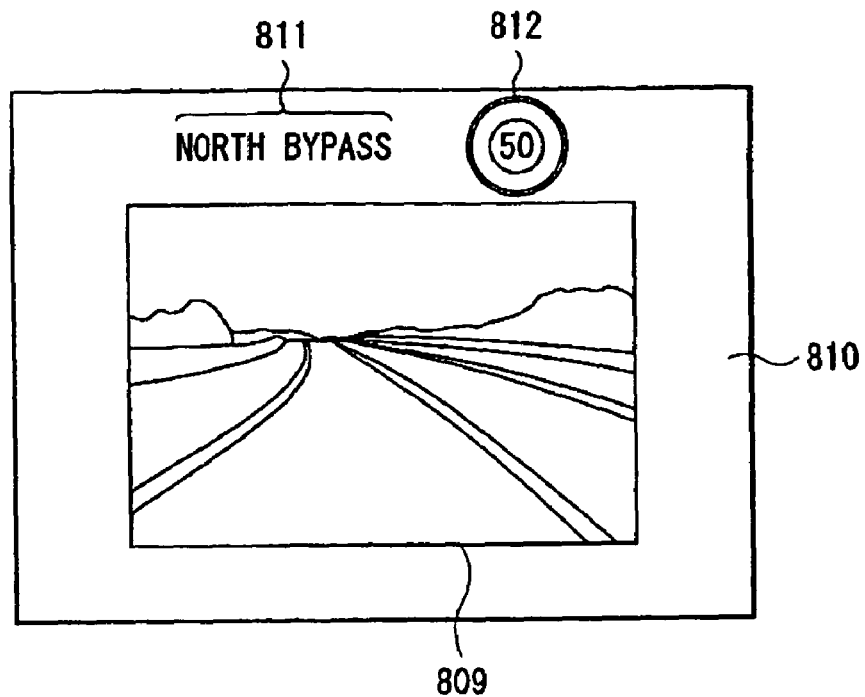
FIG. 10 is a view showing an example of a screen structure in the case that a character information exclusive display region is previously provided on the periphery of a real picture.

Otherwise, it is possible to adopt the method as shown in an example of FIG. 10. In the method, of the navigation information, road name information 811 and limiting speed information 812 set to be displayed as the character information is displayed not in the real picture but in a character information exclusive display region 810 previously provided on the periphery of the real picture 809.

Otherwise, it is possible to classify the navigation information into three types of the warning information, the guidance information, and the additional information depending on urgency of display. In the order corresponding to the classification, each piece of the navigation information can be composited and displayed in a relevant position in the real picture.

Figure 11:
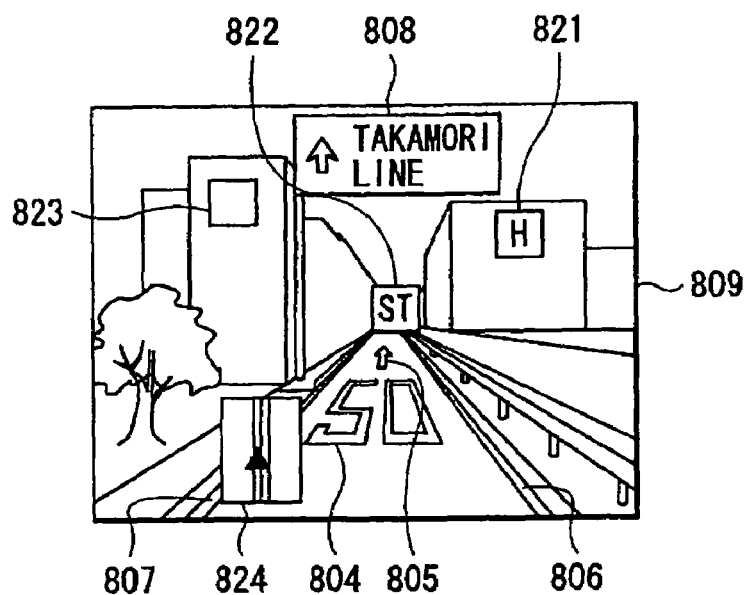
FIG. 11 is a view showing another example (different from the view of FIG. 8) of the image finally displayed.
Figure 12:
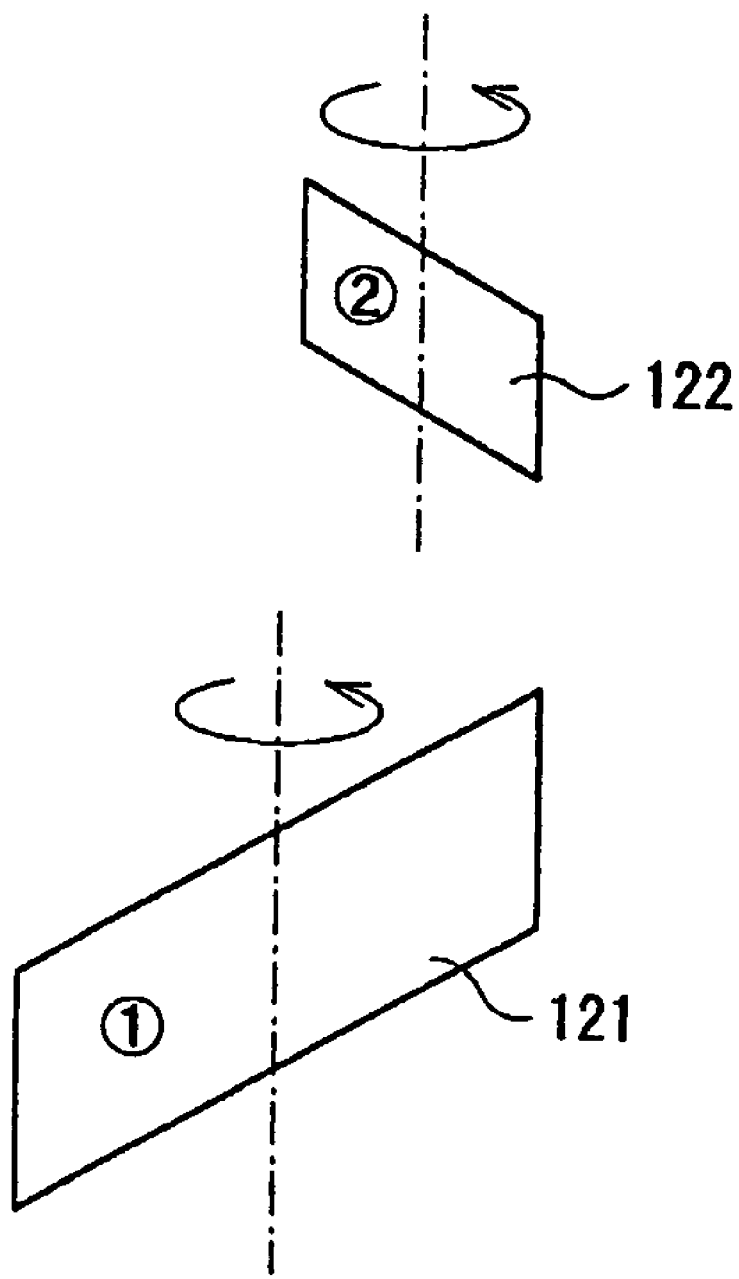
FIG. 12 is a schematic view showing a state that 2 three-dimensional icons are displayed while being rotated at a phase different from each other.
Figure 13:
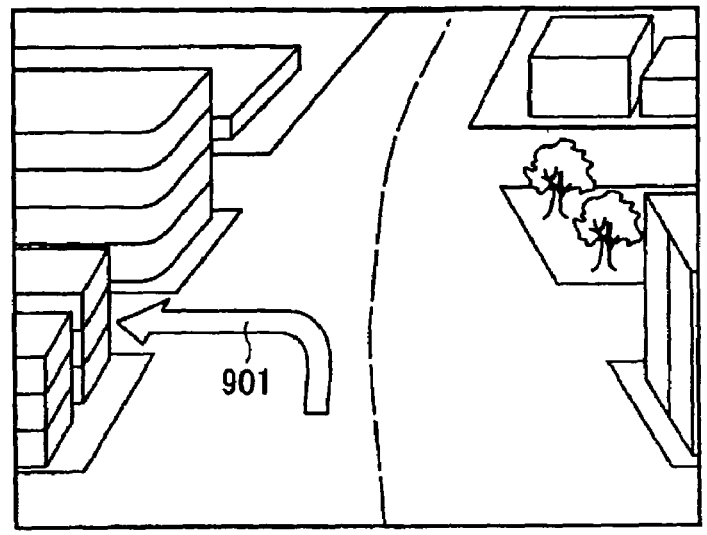
FIG. 13 is a view showing an example of a picture on which an image of navigation information is superimposed, which is stated displayable in Patent document 1.
Figure 14:
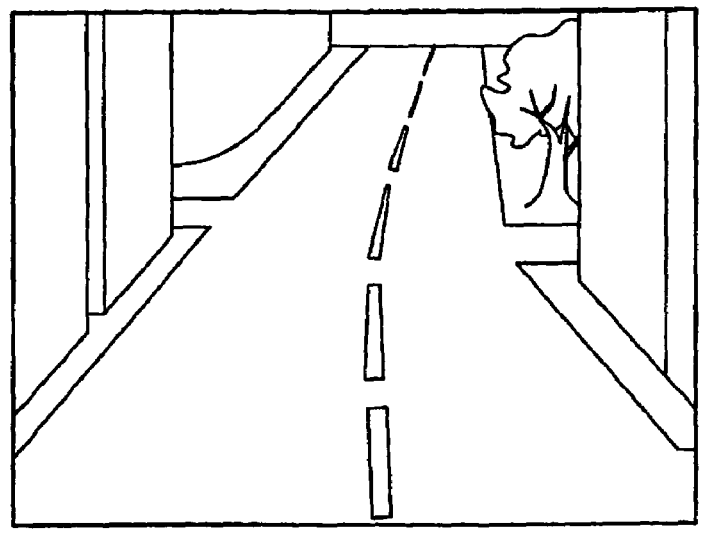
FIG. 14 is a view showing an example of a landscape ahead of a real motor vehicle that is seen through a windshield from a driver seat of the real motor vehicle.
Figure 15A:
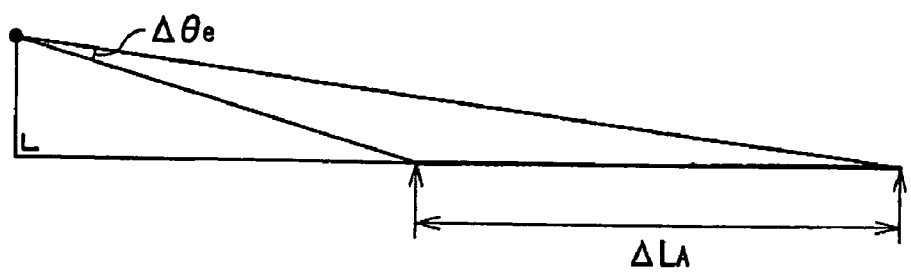
FIGS. 15A and 15B are schematic views to compare the degree of change of a projection image onto a road surface with respect to unit angle change in the visual line from a driver seat at about 1 m high of a general vehicle (FIG. 15A) to the degree of change of a projection image onto a road surface with respect to unit angle change in the visual line at about 10 m high, which is higher than the height in FIG. 15A (FIG. 15B).
Figure 15B:
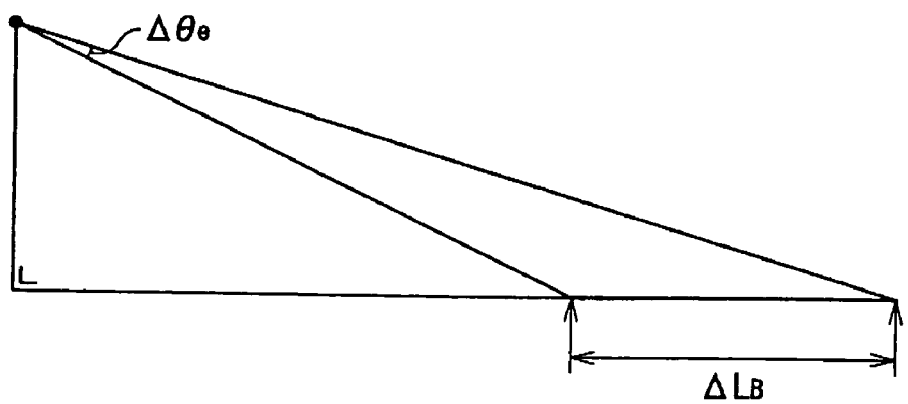

That is, for general navigation information such as a land mark and small to medium facilities other than the information necessary for urgently issuing a warning to the user such as warning information (that is, navigation information with the urgency lower than that of the information such as the warning information), display is made on and after when the current position of the movable body to the warning target in the real picture (or real landscape in the case of HUD) enters within a given distance. A description thereof will be given more specifically with reference to an example shown in FIG. 11. At this point, 3 three-dimensional icons, 821 (representing a "hotel"), 822 (representing a gas station), 823 (representing a convenience store) are displayed. All thereof starts to be displayed when each real substance enters within a predetermined distance such as 100 m to the vehicle of the user. Each icon is not displayed when the real substance is located apart from the vehicle farther than the predetermined distance. In the example of FIG. 11, the farthest three-dimensional icon 822 just enters within the given distance and starts to be displayed.

Further, as simple road map information 824 displayed in the lower left of the real picture (screen) of FIG. 11, the image of the navigation information is displayed as a translucent icon so that the real picture as a background can be viewed translucently. It is needless to say that not only the simple road map information 824 but also other information can be displayed as a translucent icon.

As hereinbefore described in details, according to the movable-body navigation information display unit and the movable-body navigation information display means of this embodiment, the image of the navigation information can be accurately composited in the appropriate position in the real picture of the road ahead of the movable body or in the real landscape seen thorough the windshield. In the result, the picture can be displayed so that the driver can intuitively and accurately recognize the relation between the navigation information and the real picture or the real landscape. In addition, it is possible to avoid the state that visibility of the real picture (or real landscape) is inhibited by the image of the navigation information due to the composition of the navigation information by the various methods described above. Consequently, the visibility can be favorable over the entire display image.

The invention claimed is:

1. A movable-body navigation information display method comprising the steps of:
    detecting a current position of a movable body, and capturing a real picture with an object of a landscape including a road in a traveling direction of the movable body by an in-vehicle camera set in the movable body;
    reading navigation information on travel of the movable body corresponding to the detected current position of the movable body from navigation information previously stored in association with road map data;
    creating a road shape model of a road assumed to be captured from the current position, based on the current position of the movable body and the road map data;
    extracting road shape data as image data of the road included in the landscape from the real picture;
    converting the road shape data to image data in a perspective two-dimensional characteristics space and the data of the road shape model to image data in the perspective two-dimensional characteristics space;
    obtaining an existence probability of a road white line included in the landscape from the real picture and calculating an RSL value by using a road look-up table (RSL);
    matching the two-dimensional road shape data with the two-dimensional data of the road shape model in the two-dimensional characteristics space so that an evaluation value based on the RSL value becomes the maximum, and thereby estimating the posture data of the in-vehicle camera or the movable body to the road as the object;
    determining a display position in the captured real picture of the navigation information read according to the current position of the movable body based on the posture data; and
    displaying an image in which the read navigation information is composited with display dimensions and tone set by a user in the determined position in the captured real picture.

2. The movable-body navigation information display method according to claim 1, wherein in creating the road shape model, the road shape model of a multilane road is created by performing modeling while considering a road structure in which one-way grade of a traveling road surface in a curved road is set to change according to a horizontal curvature of the curved road.

3. The movable-body navigation information display method according to claim 1, wherein the navigation information is at least one of a course guide of a route to reach a destination of the movable body, a position of a vehicle, a driving lane of the vehicle, and a building as an eyemark for a driver of the movable body to check the course guide or the position of the vehicle.

4. A movable-body navigation information display unit comprising:
  a current position detecting means for detecting a current position of a movable body;
  a capturing means for capturing a real picture with an object of a landscape including a road in a traveling direction of the movable body by an in-vehicle camera set in the movable body;
  a data processing means for reading navigation information on travel of the movable body corresponding to the detected current position of the movable body from navigation information previously stored in association with road map data, creating a road shape model of a road assumed to be captured from the current position based on the current position of the movable body and the road map data, extracting road shape data as image data of the road included in the landscape from the real picture, converting the road shape data to image data in a perspective two-dimensional characteristics space and the data of the road shape model to image data in the perspective two-dimensional characteristics space, obtaining an existence probability of a road white line included in the landscape from the real picture and calculating an RSL value by using a road look-up table (RSL), matching the two-dimensional road shape data with the two dimensional data of the road shape model in the two-dimensional characteristics space so that an evaluation value based on the RSL value becomes the maximum and thereby estimating the posture data of the in-vehicle camera or the movable body to the road as the object, determining a display position in the captured real picture of the navigation information read according to the current position of the movable body based on the posture data, and outputting data for displaying an image in which the read navigation information is composited as an image displayed with display dimensions and tone set by a user in the determined position in the captured real picture; and
  an image display means for compositing and displaying the read navigation information as the image displayed with the display dimensions and the tone set by the user in the determined position of the captured real picture based on the data outputted from the data processing means.

5. The movable-body navigation information display unit according to claim 4, wherein in creating the road shape model, the data processing means creates the road shape model of a multilane road by performing modeling while considering a road structure in which one-way grade of a traveling road surface in a curved road is set to change according to a horizontal curvature of the curved road.

6. The movable-body navigation information display unit according to claim 4, wherein the navigation information is at least one of a course guide of a route to reach a destination of the movable body, a position of a vehicle, a driving lane of the vehicle, a building as an eyemark for a driver of the movable body to check the course guide or the position of the vehicle.

* * * * *